Feb. 20, 1962     R. C. EARLOUGHER     3,021,901
TREATMENT OF FLUID-PRODUCING FORMATIONS
Filed Jan. 7, 1959
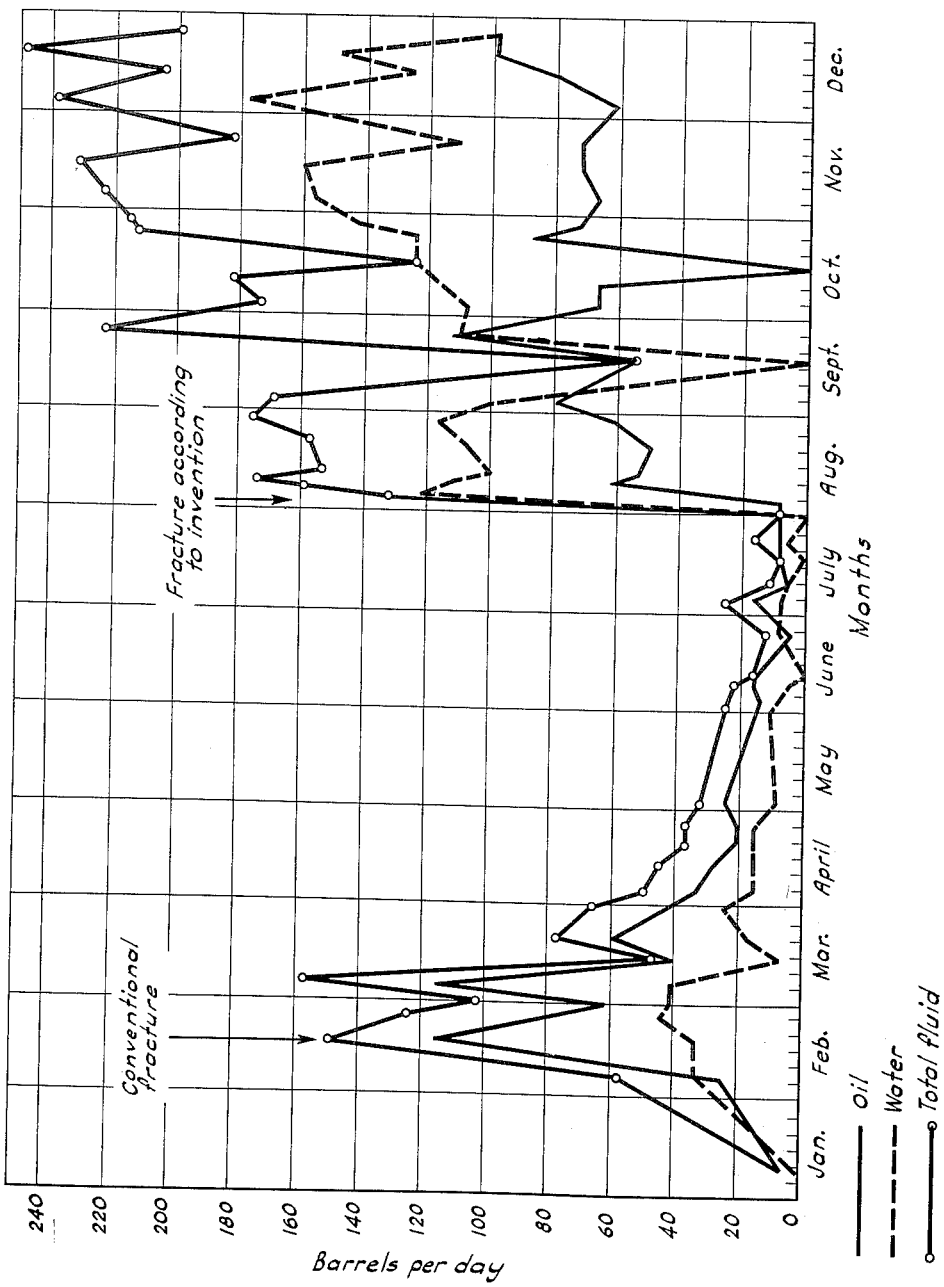
INVENTOR.
Robert C. Earlougher
BY
Griswold & Burdick
ATTORNEYS 3,021,901
TREATMENT OF FLUID-PRODUCING
FORMATIONS
Robert Charles Earlougher, Tulsa, Okla., assignor to
The Dow Chemical Company, Midland, Mich., a corporation of Delaware
Filed Jan. 7, 1959, Ser. No. 785,527
8 Claims. (Cl. 166—42)

The invention is concerned with a method of and composition for treating fluid-producing subterranean formations penetrated by a wellbore. It more particularly pertains to an improved fracturing liquid and method of fracturing petroliferous formations in which, during oil or gas producing operations, salts of low solubility are deposited in the pores and channels of the formation and in the wellbore thereby impeding the flow of fluids therethrough.

The instant application is a continuation-in-part of application Serial Number 674,491, filed July 26, 1957.

The production of oil or gas usually has associated therewith an appreciable flowage of underground waters which almost invariably contain varying amounts of dissolved substances. These dissolved substances often undergo chemical and/or physical changes as the underground waters progress toward the wellbore. These changes disturb the equilibrium of the dissolved substances and frequently result in their being precipitated out and being deposited in and along the channels and interconnecting pores which make up the drainage zone of the formation which is penetrated by the well. Examples of chemical changes which likely contribute to these undesirable conditions are the intermixing of different brines which come together within formations, particularly one or more brines high in calcium ions and one or more high in sulfate or carbonate ions; loss of $CO_2$ and reduction of carbonic acid content thereby lessening the solubility therein of such compounds as calcium sulfate; and the conversion of bisulfates to sulfates and of bicarbonates to carbonates. Examples of physical changes effecting precipitation in the formation channels and wellbore are reduction in temperature or pressure as the fluid progresses toward the wellbore.

The deposition of the substances from the underground waters have a pronounced detrimental effect upon production from the formation and, therefore, have been the cause of continuous or recurring obstacles to high production from the formation. They have interfered in both primary production and secondary oil recovery operations. The permeability of the formation is often so impaired as to require frequent treating operations or even abandonment of the well. Illustrative of the more detrimental insoluble salts which are formed by the changes in the underground waters are the sulfates and carbonates of calcium, barium, strontium and the carbonate of magnesium; calcium sulfate is particularly objectionable.

Wells are often situated in a formation which permits the employment of a plurality of wells wherein some wells are used for the injection of a driving fluid and other wells are used as the flowing or producing wells. Water is frequently used as the driving fluid. Success of such a plan has often eluded those employing it because the recesses, pores, and channels of the formation, particularly those in the portions of the formation in the immediate vicinity of the producing wells, have become choked with carbonates and sulfates of calcium and barium and the carbonates of magnesium. Wells which have been fractured by the injection of liquids with or without gelling agents and/or propping agents, showing improved production when first put back in production, have declined within a relatively short time to very low productivity despite evidence of extensive oil reserves in the formation. Investigations have shown that mineral deposits, particularly the sulfates and carbonates of calcium and barium, and to a lesser extent, calcium carbonate, have clogged both the natural passageways and those produced by the fractures provided by the fracturing operation, thereby restricting the flow through the formation to approximately that existing before fracturing, or even to a flow lower than that preceding fracturing.

Heretofore, a carbonate deposit has largely been removed by repeated acidizing treatment, as with an aqueous solution of HCl, preferably containing a corrosion inhibitor. However, sulfate deposits, being only slightly soluble in acidizing solutions, present problems which have only been overcome to a limited extent, if at all, by such mechanical means as blasting with nitroglycerine and fracturing. Chemical treatment to remove sulfates, such as the use of hot NaOH solution has been attempted but has been largely unsatisfactory. The problems presented by the deposition of low-solubility salts entail the expenditure of considerable time and money because, even though a substantial portion of the sulfates and carbonates might be removed by specific treatments for that purpose, the remedies heretofore employed are only temporary ones doing nothing significant to alleviate the trouble at the source. The flow of fluids after each treatment again causes an accumulation of low-solubility salts in the inflow channels reducing the flow to uneconomic levels unless subsequent treatments are performed.

Attempts to solve the problem created by the aforesaid deposition of relatively insoluble substances by merely dropping treating compounds including various known sequestering and water softening agents down the wellbore have had little or no beneficial effect on production beyond the possibility of one lasting a few hours or, at most, a few days.

More effective prevention of clogging of pores and passageways in subterranean fluid-bearing formations resulting from the deposition of low-solubility salts has therefore constituted a long-felt need.

The principal object of the invention, accordingly, is to provide an improved method of treating fluid-bearing formations traversed by a wellbore. A more particular object is to reduce substantially the deposition of low-solubility salts, e.g., carbonates and sulfates, in the pores, channels, and fissures of such formations.

The invention comprises an improved method of treating fluid-bearing subterranean formations, e.g., petroliferous formations, which consists essentially of injecting a suspension of one or more complex salts which are alkali metal alkaline earth metal polyphosphates in a water-base or oil-base liquid, which may also have admixed therewith a propping agent and/or a gelling or thickening agent, into those portions of a subterranean formation traversed by a well, which are in communication with, but more-or-less remote from the wellbore.

The alkali metal component of said polyphosphates is usually sodium, potassium or lithium. The alkaline earth metal component may be magnesium, calcium, strontium, or barium, but is usually magnesium or calcium, for example, as described and claimed in U.S. Patent 2,370,472. The polyphosphates may be considered polymetallic substitution products of orthophosphoric acid wherein some hydrogen atoms have been replaced by at least one alkali metal and other hydrogen atoms by at least one alkaline earth metal to form complex macromolecules containing, e.g., metaphosphate groups. When $H_3PO_4$ is reacted at a suitably high temperature with NaOH in a molar ratio of 1 $H_3PO_4$ to 1, 2 or 3 moles of NaOH, the products formed are $NaH_2PO_4$, $Na_2HPO_4$ or $Na_3PO_4$, respectively. However, when either $Ca(OH)_2$ or $Mg(OH)_2$ is present, or both $Ca(OH)_2$ and $Mg(OH)_2$ are present, or subsequently reacted therewith in suitable quantities, the hydrogen portion of these products is replaced by calcium or magnesium or both to form the polymetallic polyphosphates containing at least one alkali metal and at least one alkaline earth metal as employed in the practice of the invention.

Sodium magnesium polyphosphate and sodium calcium polyphosphate and mixtures thereof and the complex sodium calcium magnesium polyphosphate are representative of the alkali metal alkaline earth polyphosphates to be employed according to the invention.

When a sodium magnesium polyphosphate is employed in the practice of the invention, it is preferable that it fall within the following molar percentages determined by analysis:

$P_2O_5$ between 33⅓ and 50 molar percent
$Na_2O$ at least 32 molar percent
$MgO$ between 2.5 and 17.5 molar percent When a sodium calcium polyphosphate is employed in the practice of the invention, it is preferable that it fall within the following molar percentages determined by weight analysis:

$P_2O_5$ between 33⅓ and 50 molar percent
$Na_2O$ at least 8 molar percent
$CaO$ between 6 and 40 molar percent When mixtures of sodium magnesium polyphosphates and sodium calcium polyphosphates or complex sodium magnesium calcium polyphosphate are employed in the practice of the invention, the analysis of the MgO and CaO should be proportional to the Mg and Ca atoms present in the treating compound employed. For example, if magnesium and calcium are present in equimolar quantities in the treating compound, then at least ½ of 2.5 or 1.25 molar percent of MgO should be present and at least ½ of 6 or 3 molar percent of CaO should be present in the oxides thereof.

The $P_2O_5$ preferred range will remain at between 33⅓ and 50 molar percent.

The $Na_2O$ should preferably be about $$\frac{8+32}{2} \text{ or } 20$$

for a treating compound containing equimolar quantities of Mg and Ca atoms. The $Na_2O$ recommended minimum would be correspondingly higher than 20 molar percent for mixed sodium alkaline earth polyphosphates having greater than equimolar quantities of magnesium and would be correspondingly lower than 20 molar percent for such mixed polyphosphates having greater than equimolar quantities of calcium.

One method of preparing alkali metal alkaline earth polyphosphates for use in the invention is described in U.S. Patent 2,370,472.

Sodium calcium magnesium polyphosphates are described in U.S. Patent 2,539,305.

The alkali metal alkaline earth polyphosphate should be particulated. It is recommended that the particle size be such that at least 99 percent will pass through a No. 12 mesh sieve and preferably not more than 10 percent will pass through a No. 100 mesh sieve (U.S. Standard Sieve Series).

A method of preparing sodium magnesium polyphosphate is as follows:

Admix in a suitable heat-resistant vessel, the following:

23 grams of 85 percent $H_3PO_4$ 5.85 grams of NaOH 1.62 grams of $Mg(OH)_2$

Heat the mixture gradually to between 800° and 850° C. and hold in that temperature range for about 1 hour to convert the mixture into a substantially clear fused liquid. Then rapidly cool the liquid to form a vitreous fusion product. The fusion product is comminuted to a suitable particle size. The product thus made has the following composition in molar percent:

| $P_2O_5$ | $Na_2O$ | $MgO$ | or | $NaPO_3$ | $Mg(PO_3)_2$ |
|---|---|---|---|---|---|
| 50.0 | 36.5 | 13.5 | | 84.4 | 15.6 |

Nalco 312 and Nalco 315 are examples of commercially available alkali metal magnesium polyphosphates having the desired proportions of the oxide constituents for use in the practice of the invention.

F–1 and Calgon 15–J are examples of commercially available alkali metal calcium polyphosphates having the desired proportions of the oxide constituents for use in the practice of the invention.

Table I below sets out the molar composition and weight composition of the above-named polyphosphates.

TABLE I

*Chemical analysis of certain sodium alkaline earth polyphosphates useful in invention*

| Material | $Na_2O$ | | CaO or MgO | | $P_2O_5$ | |
|---|---|---|---|---|---|---|
| | Percent by Weight | Mole Percent | Percent by Weight | Mole Percent | Percent by Weight | Mole Percent |
| Sodium Calcium Polyphosphates: | | | CaO | | | |
| F–1, procurable from Hagan Chemicals & Controls, Inc. | 13 | 20.4 | 18 | 32.3 | 69 | 47.3 |
| 15–J, procurable from Calgon Company (a division of Hagan) | 23.5 | 36.8 | 10.3 | 17.9 | 66.2 | 45.3 |
| Sodium Magnesium Polyphosphates: | | | MgO | | | |
| Nalco 312, procurable from National Aluminate Co. | 28.84 | 44.0 | 5.12 | 12.0 | 66.04 | 44.0 |
| Nalco 315, procurable from National Aluminate Co. | 28.41 | 42.5 | 6.52 | 15.0 | 65.07 | 42.5 |

It is known to use such readily water-soluble phosphates as sodium pyrophosphate, sodium hexametaphosphate, monosidum phosphate, and disodium phosphate to alter the characteristics of certain hard waters. Such water-soluble phosphates are not suitable for the instant invention. The effectiveness of the instant invention is dependent upon the limited solubility of alkali metal alkaline earth polyphosphates; upon their property of remaining in suspension in liquids during injection into earth formations, particularly the more remote recesses and channels thereof and to settle out of suspension in remote recesses and channels of a subterranean formation thereby to be lodged in the flow channels in the formation, subsequently to dissolve very gradually in aqueous solutions moving toward the well; and to sequester metal ions, particularly group II ions therein, to reduce substantially the clogging of pores and passageways due to the deposition of low-solubility salts. It is necessary that the alkali metal alkaline earth polyphosphate be deposited well back in the formation so that underground and injected waters moving toward the wellbore will contact the thus-deposited material before entering the channels and passageways of the formation nearer to the wellbore.

The mechanism involved in the sequesteration of such ions as calcium and barium by the polyphosphates of the invention is not known definitely, but it is thought that the growth of the individual crystals of the precipitating compound, e.g., the sulfates and carbonates of calcium and barium, is inhibited by the presence of the polyphosphate ions yielded by the alkali metal alkaline earth metal polyphosphate (perhaps by forming a chemically complex coating around the crystal nuclei). The formation of new crystals then begins until a balance of all ions present in the aqueous liquid of the formation is obtained and further crystal growth is arrested. The small crystals thus formed remain in suspension or as a colloidal precipitate and are carried along in the inflow of the water or brine to the wellbore without clogging the formation. A particularly important feature of the composition of the invention is that the polyphosphates used therein dissolve slowly and have a sufficiently delayed action to continue to affect the crystal growth in the aqueous liquid throughout its course through the formation and wellbore.

The solubility of various polyphosphates, added as a powder of about 20 to 40 mesh particle size at 80° F. in a brine, is shown in Table II. An analysis of the brine used to determine these solubility values showed it to contain sodium, calcium, and chloride ions in parts per million as follows: calcium, 8600; sodium, 43,000; and chloride, 86,000.

TABLE II

| Test No. | Phosphate Material | Percent Solubility After 24 hours | Appearance After Addition due to Formation of $Ca_3(PO_4)_2$ |
|---|---|---|---|
| 1 | Sodium magnesium polyphosphate, Nalco 312. | 1 | Clear. |
| 2 | Sodium magnesium polyphosphate, Nalco 315. | 1 | Do. |
| 3 | Sodium calcium polyphosphate. | 1 | Do. |
| 4 | Sodium tripolyphosphate (Pentasodiumtriphosphate). | 1 | Some finely divided ppt. |
| 5 | Sodium pyrophosphate. | 1 | Do. |
| 6 | Sodium hexametaphosphate. | 100 | Heavy ppt. |
| 7 | Sodium trimetaphosphate [1]. | 20 | Some ppt. |
| 8 | Sodium tetrametaphosphate. | 1 | Small amount ppt. |
| 9 | Monosodium orthophosphate. | 100 | Heavy ppt. |
| 10 | Disodium orthophosphate. | 100 | Do. |
| 11 | Hemisodium orthophosphate $NaH_5(PO_4)_2$. | 100 | No ppt. |

[1] Added as ½″ diameter balls.

Table II shows that the limited solubility of the sodium magnesium polyphosphate and sodium calcium polyphosphates is excellent for the purposes of the invention. Although sodium tripolyphosphate, sodium pyrophosphate, and sodium tetrametaphosphate gave some beneficial effect they are not acceptable because some precipitate is formed within too short a period as shown by the test.

The solubility of the sodium alkaline earth polyphosphates at different temperatures in the brine, having the analysis given above, is shown in Table III. 8 grams of the polyphosphate, dispersed in 800 milliliters of the brine described above, were used in the tests shown in Table III.

The results are given in parts per million (p.p.m.) of phosphate ions after 2 hours in the brine.

TABLE III

| Test No. | Temp. in ° F. | p.p.m. Polyphosphate. Analyzed as $P_2O_5$ after 2 hrs. | | |
|---|---|---|---|---|
| | | Sodium Magnesium Polyphosphate, Nalco 312 | Sodium Calcium Polyphosphate, | |
| | | | Hagan F-1 | Calgon 15-J |
| 11 | 120 | 176 | 102 | 1,065 |
| 12 | 150 | 384 | 290 | 1,915 |
| 13 | 175 | 870 | 387 | 2,950 |
| 14 | 200 | 1,300 | 700 | 7,300 |

Table III shows that even at 200° F., the solubility of the sodium magnesium polyphosphate and sodium calcium polyphosphate in the brine employed is satisfactorily low to attain the objects of the invention.

Polyphosphates heretofore employed as sequestering agents, e.g., sodium hexametaphosphate and sodium pyrophosphate which revert readily to the orthophosphate, have been shown hereinabove to be unsuitable for the practice of the invention. The polyphosphates useful in the invention revert only slowly to the orthophosphate and remain in the polyphosphate form for relatively long periods of time. They are, therefore, effective in the prevention of precipitation and deposition of the insoluble calcium, magnesium and barium salts for a correspondingly long time. The tests set out in Table IV below show the extent of such reversion in parts per million during periods of 2 and 6 hours. The tests consisted of dispersing 1 gram of the dimetallic polyphosphate of the invention in 100 milliliters of water and then admixing the dispersion thus formed with a 10 percent by weight NaCl brine.

TABLE IV

| Type of Polyphosphate Added | Temp. in ° F. | Percent Polyphosphate Reverted to Orthophosphate | |
|---|---|---|---|
| | | After 2 hrs. | After 6 hrs. |
| Sodium Calcium (F-1) | 120 | 0 | 1.0 |
| Do | 150 | 3.1 | 9.5 |
| Do | 175 | 9.6 | 22.5 |
| Sodium Magnesium (Nalco 315) | 120 | 2.2 | 3.5 |
| Do | 150 | 4.2 | 7.0 |
| Do | 175 | 10.5 | 21.5 |

The relatively small percentages of polyphosphates which reverted to the orthophosphate even after six hours shows that the water carrying them would maintain its sequestering effect for a time sufficiently long to protect against deposition of the insoluble salts during a well treatment.

The effectiveness of the sodium magnesium polyphosphate and sodium calcium polyphosphate to prevent precipitation of calcium sulfate when an aqueous solution of high calcium ion content and an aqueous solution of high sulfate ion content are intermixed, is shown below in Table V. The aqueous solutions were prepared by adding predetermined amounts of a soluble calcium salt and a soluble sulfate salt to water in separate containers. The quantity of sodium magnesium or sodium calcium polyphosphate present in the tests shown in Table V was based on the p.p.m. of $P_2O_5$ by weight present in the final mixed solutions. Table V shows the time required for various concentrations of calcium and sulfate ions in the solutions thus prepared and intermixed to show a precipitation of $Ca_3(PO_4)_2$ both when no alkali metal alkaline earth polyphosphate was added and when it was added in different amounts to successively mixed solutions.

TABLE V

| Polyphosphate Present | $P_2O_5$ in p.p.m. | $Ca^{++}$ in p.p.m. | $SO_4^-$ in p.p.m. | Temp., °F. | Time Required for Calcium Sulfate to Precipitate, in Hours |
|---|---|---|---|---|---|
| Sodium Magnesium (Nalco 315) | 0 | 5,000 | 2,000 | 80 | Formed in 0.5. |
| Do | 1 | 5,000 | 2,000 | 80 | Trace in 2.0. |
| Do | 5 | 5,000 | 2,000 | 80 | None in 24.0. |
| Do | 10 | 5,000 | 2,000 | 80 | Do. |
| Do | 0 | 8,600 | 5,000 | 80 | Formed in 1.0. |
| Do | 1 | 8,600 | 5,000 | 80 | Formed in 5.0. |
| Do | 5 | 8,600 | 5,000 | 80 | Formed in 28.0. |
| Do | 10 | 8,600 | 5,000 | 80 | Formed in 120.0. |
| Sodium Calcium (Calgon 15-J) | 10 | 5,000 | 5,000 | 80 | None in 48.0. |
| Do | 10 | 8,600 | 5,000 | 80 | Do. |
| Sodium Magnesium (Nalco 315) | 100 | 5,000 | 2,000 | 120 | Formed in 0.5. |
| Sodium Calcium (Hagan F-1) | 100 | 5,000 | 5,000 | 120 | Formed in 7.0. |
| Do | 100 | 5,000 | 5,000 | 150 | Formed in 2.5. |
| Do | 100 | 5,000 | 5,000 | 175 | Formed in 1.25. |

An examination of Table V shows that as little as 1 part per million of the sodium magnesium or sodium calcium polyphosphate as measured by the $P_2O_5$ content is definitely effective in preventing the formation of calcium sulfate within the time it would have formed without the presence of the polyphosphate used according to the invention. It shows, too, that at least 5 p.p.m. of the polyphosphate gives better results than only 1 p.p.m. and that up to 100 p.p.m. may be used with excellent results. Considerably higher concentrations than 100 p.p.m. of the polyphosphate may be employed in the treatment of petroliferous formations traversed by a well with satisfactory results. However, 1 to 100 p.p.m. are more economical to employ and 1 to 40 p.p.m. are recommended as measured in the produced fluid from the well. Petroleum, water and emulsions thereof being normally found in petroliferous formations and, therefore, uncontaminating of the formation and satisfactorily unreactive with the polyphosphates dispersed therein, are employed as the liquid of the composition employed in the practice of the invention. Emulsions of oil and water or oil are the preferable liquid to employ and usually contain a gelling agent, propping sand and a fluid loss preventive. The liquid preferably has a pH value of at least 6.

A satisfactory oil to employ in the invention is a crude oil or a refined petroleum oil of between 6 and 45° A.P.I. gravity, having a viscosity of between 10 and 5,000 centipoises measured at 80° F. For practical purposes, the preferable range of viscosity is between 20 and 500 centipoises.

Ottawa sand having a particle size between about No. 10 and a No. 60 mesh size is illustrative of the preferred propping agent, if desired. An aliphatic organic acid having between 12 and 20 carbon atoms and an aqueous solution of an alkali metal base previously intermixed are illustrative of a suitable gelling agent, if one is desired.

The preferred mode of practicing the invention is to suspend the alkali metal alkaline earth polyphosphate in a suitable liquid as water, a suitable oil, or emulsion, preferably one containing sand as a propping agent, and forcing the fluid, thus prepared, down a wellbore traversing a producing formation and thence into outlying areas of the producing formation. The wellbore may be that of a producing well or it may be an input well in communication with one or more output wells in a water-flooding operation.

The amount of the alkali metal alkaline earth polyphosphate to add to the liquid of the well-treating composition may be based on the parts per million (usually conveniently calculated as $P_2O_5$) by weight polyphosphate in the fluid flowing from or being produced from the well or it may be based on a given number of pounds of the polyphosphate per given number of gallons of treating composition. Between 1 and 100 parts of polyphosphate per million parts of the fluid being produced or between 10 and 250 pounds of polyphosphate per 1000 gallons of the fracturing composition are recommended.

When the embodiment of the invention is the injection of the alkali metal alkaline earth polyphosphate into remote interconnecting channels and fissures in conjunction with a fracturing operation (such fissures especially including those newly created during the fracturing), the fractures are induced in the formation according to methods known in the art of well treating. The fracturing step described by Farris in Reissue Patent 23,733 of U.S. Patent 2,596,843 may be suitably applied to the practice of the instant invention.

When the embodiment of the invention is the injection into fissures and channels of a formation from which fluids are being produced by an aqueous liquid drive, particularly in large fields practicing a unit plan of operation (one or usually a plurality of input wells, controlled by more than 1 owner, advantageously positioned in relation to one or more output wells in a formation), the alkali metal alkaline earth polyphosphate described herein is dispersed in the water drive liquid prior to or while it is being injected down an input well. A substantial amount of the slowly dissolving polyphosphate is thereby deposited in fissures and channels near the input well and as a result gradually dissolve in the aqueous drive liquid passing therethrough, thus preventing the deposition of the insoluble salts being formed in the formation during production. Known water drive or flooding methods commonly practiced in oil and gas production may be suitably applied to the practice of the instant invention.

An example is set out below which contrasts conventional fracturing with fracturing according to the invention.

EXAMPLE

A water-flood well in the Yates formation in the vicinity of Kermit, Texas, which was 2,429 feet deep with a bottom temperature of 120° F. and cased with a 5½ inch casing, which was perforated at the level where the fracturing was to be done, was used in this example. The drawing, annexed hereto, is a graph showing the production history of the well throughout one year.

The production of this well had fallen off to about 5 barrels of oil per day and substantially no water. The well, therefore, had been previously fractured according to known practice as indicated in the drawing. The practice was largely according to the method described in Re-issue 23,733 of U.S. Patent 2,596,843 with certain modifications among which were (1) injecting the fracturing fluid into the well in two substantially equal amounts in two stages, (2) employing sand of a particle size between 20 and 40 mesh (U.S. Sieve Series), and (3) injecting naphthalene (mothballs) admixed with the fracturing fluid in the well between the first and second injection of fracturing fluid. The method was basically that of the instant invention which was subsequently used on the well and described hereinbelow, except no alkali metal alkaline earth polyphosphate was used in this earlier known fracturing operation. The production of the well after fracture had risen immediately thereafter to 118 barrels of oil per day with 41 barrels of water per day. However, within 2 weeks after fracture by this known method, it had fallen to 47 barrels of oil with 8 barrels of water per day and had continued to fall off gradually within a period of about 4 months to 8 barrels of oil per day and substantially no water.

The well was then fractured according to the invention as set out below.

The fracturing liquid of the invention was prepared by admixing a 20 to 40 mesh flint shot sand and Nalco 312 as described hereinabove with a petroleum oil in a blending tank. The oil was a 20 A.P.I. gravity oil having a viscosity of about 200 seconds (Saybolt Universal) at 210° F.

The well was fractured in two stages as follows:

First stage: 200 pounds of Nalco 312 and 5000 pounds of the sand were mixed with 2500 gallons of the oil in a blender to form a substantially homogeneous slurry. A string of tubing was run down the well and packers set in the annulus at 2382-foot and 2409-foot levels which defined the upper and lower limits of the formation to be fractured. The slurry was pumped down the tubing and into the annulus through the perforations in the casing and then into the adjacent formation.

Following the first stage injection, 600 pounds of mothballs (naphthalene) of a particle size such that 50 percent of them passed through a No. 4 mesh screen and 50 percent passed through a No. 10 mesh but were retained on a No. 20 mesh screen, were dispersed in sufficient additional fracturing oil to make a pumpable slurry and the slurry pumped down the tubing in a manner similar to that described in U.S. Patent 2,734,661.

Naphthalene first exerts a bridging effect within a formation into which it is deposited, thereby temporarily blocking off certain passageways leading into the more accessible portions of the formations. While these passageways are thus blocked off, further injection of fracturing fluid will be diverted to less accessible portions of the formations. Naphthalene gradually dissolves in the hydrocarbon liquids of the formation and is recovered from the well when the well is put back into production. Although the use of naphthalene forms no part of this invention, it served as an aid for getting the sodium magnesium polyphosphate well back into the outlying areas of the formation.

Second stage: While the more accessible portions of the formation were thus blocked off, an additional 200 pounds of Nalco 312 and 5000 pounds of the sand and 2500 gallons of the type of fracturing oil employed in the first stage were admixed and pumped into the well in a similar manner to that in the first stage but were forced back into more remote portions of the formation.

Following the second stage, the well was shut in for a few hours and thereafter put back in production.

An examination of the graph in the accompanying drawing shows that fracturing the well with the composition of the invention which contained sodium magnesium polyphosphate was highly effective in increasing the productivity of the well and continuing that productivity throughout the balance of the time that data were available. The contrast in production following the earlier fracture which had been performed according to known methods and that following the fracture according to the invention is due to the presence of the polyphosphates in the water of the well in the second instance whereby the precipitation of the carbonates and sulfates of calcium and barium and, to a lesser extent, magnesium, which caused clogging and near-stoppage of flow of the well in the first instance, were prevented from forming when the formation was fractured according to the invention.

Instead of the sodium magnesium polyphosphate employed in the example above, sodium calcium polyphosphates or sodium calcium magnesium polyphosphates may be employed with similarly beneficial results.

High economic value is to be realized from a practice of the invention. Only small amounts of the alkali metal alkaline earth polyphosphates are required to be employed according to the invention. They are readily available at relatively low cost. Their presence in the well has no deleterious effect upon the fluids being produced nor upon equipment employed in production. The beneficial effect appears to be due to the release of the sequestering material in situ, i.e., in the areas where the underground water passes just as it enters the passageways and inflow channels of the drainage system of the well surrounding the wellbore. A single fracturing treatment according to the invention provides sufficient protection against clogging of the connecting channels of the formation to result in a marked beneficial effect on the rate of production therefrom for an indeterminate time thereafter running at least to many months.

Having described the invention, what is claimed and desired to be protected by Letters Patent is:

1. The process of fracturing a subterranean formation penetrated by a wellbore which consists essentially of admixing, with a liquid fracturing composition, between 10 and 250 pounds, per thousand gallons of the liquid portion of said composition, of a low-solubility polyphosphate selected from the class consisting of alkali metal magnesium polyphosphates, alkali metal calcium polyphosphates, alkali metal calcium magnesium polyphosphates, and mixtures thereof to prepare a slurry of said polyphosphate and injecting the slurry down the wellbore and back into the formation with sufficient force to effect fractures in the formation and to embed at least a portion of the polyphosphate contained in the slurry in the interstices, pores, passageways, and fissures remote from the wellbore, including fissures newly made by the fracturing pressures, and to cause the polyphosphate so embedded to be held in said interstices, pores, passageways, and fissures to provide a front comprising said polyphosphate within said formation remote from said wellbore and so lodged that underground water moving in the direction of said wellbore must pass through said front and thereby cause low-solubility salt producing ions therein to come in contact with the polyphosphate comprising said front and thereby lessen the tendency to form low-solubility salts in said fluid-bearing formation.

2. The process according to claim 1, wherein the liquid fracturing composition contains sand having a particle size of between a No. 10 and No. 60 mesh.

3. The process according to claim 1, wherein the liquid fracturing composition employed contains sodium magnesium polyphosphates consisting analytically of between $33\frac{1}{3}$ and 50 molar percent $P_2O_5$, between 2.5 and 17.5 molar percent $MgO$, and the balance $Na_2O$ suspended in said fracturing liquid selected from the class consisting of petroleum oil having a gravity of between 6 and 40 A.P.I. water, and aqueous oil emulsions.

4. The process according to claim 3, wherein said liquid is water.

5. The process according to claim 1, wherein the pH of said composition is at least 6.

6. The process according to claim 1, wherein the liquid fracturing composition employed contains sodium calcium polyphosphates consisting analytically of between $33\frac{1}{3}$ to 50 molar percent $P_2O_5$, between 6 and 40 molar percent $CaO$, and the balance $Na_2O$ suspended in said fracturing liquid selected from the class consisting of petroleum oil having a gravity of between 6, water, and 40 A.P.I., and aqueous oil emulsions.

7. The process according to claim 6, wherein said liquid is water.

8. The process according to claim 6, wherein the pH of said composition is at least 6.

References Cited in the file of this patent

UNITED STATES PATENTS

| | | |
|---|---|---|
| 2,246,726 | Garrison | June 24, 1941 |
| 2,341,500 | Detling | Feb. 8, 1944 |
| 2,365,489 | Partridge | Dec. 19, 1944 |
| 2,539,305 | Hatch | Jan. 23, 1951 |
| 2,580,765 | Hall et al. | Jan. 1, 1952 |
| 2,717,243 | Bloch et al. | Sept. 6, 1955 |
| 2,777,818 | Gambill | Jan. 15, 1957 |
| 2,779,418 | Garst | Jan. 29, 1957 |

OTHER REFERENCES

Composition and Properties of Oil Well Drilling Fluids, by Walter F. Rogers, 1st edition, 1948 Gulf Publishing Company, Houston, Texas.

Rotary Drilling Handbook, by J. E. Brantly, 5th edition, Palmer Publications.